United States Patent [19]

Fahey

[11] 3,818,063

[45] June 18, 1974

[54] PREPARATION OF BIS(TRIORGANOPHOSPHINE)DI(ALKYNYL) METAL COMPLEXES

[75] Inventor: Darryl R. Fahey, Bartlesville, Okla.

[73] Assignee: Phillips Petroleum Company, Bartlesville, Okla.

[22] Filed: Mar. 28, 1973

[21] Appl. No.: 345,706

[52] U.S. Cl. ...... 260/439 R, 260/429 R, 260/666 B, 260/677 A
[51] Int. Cl. ..................... C07f 15/04, C07f 15/00
[58] Field of Search ..................... 260/439 R, 429 R

[56] References Cited
UNITED STATES PATENTS

| | | | |
|---|---|---|---|
| 3,290,401 | 12/1966 | McCall et al. | 260/666 B |
| 3,686,245 | 8/1972 | Fahey | 260/439 R |

OTHER PUBLICATIONS

Chatt et al. J. Chem. Soc. (1960) pp. 1718–1729.
Masai et al. J. Organometallic Chem. 26 (1971) pp. 271–276.

*Primary Examiner*—Patrick P. Garvin
*Assistant Examiner*—A. P. Demers

[57] ABSTRACT

A simplified procedure for the preparation of a bis(triorganophosphine)di(alkynyl) metal complex involves the reaction of a metal alkoxide, an alkyne compound, and a dihalide metal complex. For example, sodium methoxide, phenylacetylene and bis(triethylphosphine)dichloronickel can be admixed in a single step process to produce bis(triethylphosphine)di(phenylethynyl)nickel.

14 Claims, No Drawings

PREPARATION OF BIS(TRIORGANOPHOSPHINE)DI(ALKYNYL) METAL COMPLEXES

This invention relates to a process for the preparation of bis(triorganophosphine)di(alkynyl) metal complexes.

Two procedures for preparing bis(triorganophosphine)di(alkynyl) metal complexes are described by J. Chatt and B. L. Shaw in "Alkyls and Aryls of Transition Metals. Part III. Nickel(II) Derivatives," *J. Chem. Soc.* 1718–29 (1960). In one procedure magnesium, ethyl bromide and ether were contacted to produce ethylmagnesium bromide. A solution of phenylacetylene in benzene was added, and the admixture was heated for 15 minutes under reflux conditions. After the admixture was cooled to 20°C, a solution of trans-[(Et$_3$P)$_2$NiBr$_2$] in benzene was added. After 50 minutes, the solution was cooled to 0°C and hydrolyzed. The product, which was recovered in low yield was trans-bis(triethylphosphine)di(phenylethynyl)nickel.

In a second procedure sodium metal, liquid ammonia, and ferric nitrate were contacted to produce sodamide. Phenylacetylene in ether was added to the sodamide, after which trans-[(Et$_2$PhP)$_2$NiBr$_2$] was added portionwise with stirring. After 30 minutes, ammonium chloride and ether were added to the admixture while the ammonia was permitted to evaporate. Water was then added to dissolve the inorganic salts. The ether layer was separated and evaporated to dryness. Recrystallization of the residue from methyl alcohol gave impure tris(diethylphenylphosphine)di(phenylethynyl)nickel.

Both of these procedures have the disadvantage of a large number of steps being required. The use of the Grignard reagent results in low yields of the desired product. The employment of liquid ammonia and sodium metal in the second procedure presents significant handling problems for these materials. The sodamide has to be formed in a separate step prior to the reaction with the nickel halide complex to prevent the reaction of the sodium metal with the nickel halide complex. The liquid ammonia is corrosive and also tends to promote undesirable side reactions.

Accordingly it is an object of the present invention to provide an improved procedure for the production of bis(triorganophosphine)di(alkynyl) metal complexes. It is an object of the invention to achieve an acceptable yield in the production of bis(triorganophosphine)di(alkynyl) metal complexes. Another object of the invention is to avoid the problems attendant on the use of sodium metal and/or liquid ammonia. Yet another object of the invention is to reduce the number of steps required in the production of bis(triorganophosphine)di(alkynyl) metal complexes. Another object of the invention is to simplify the recovery of the desired product from the reaction mixture. Other objects, aspects and advantages of the invention will be apparent from a study of the specification and the appended claims to the invention.

In accordance with the present invention a metal alkoxide, an alkyne compound, and a dihalide metal complex are reacted, preferably in the presence of an inert diluent and in the at least substantial absence of ammonia, to form bis(triorganophosphine)di(alkynyl) metal complexes.

The metal alkoxides which can be employed in the method of this invention can be represented by the general formula ROM wherein M is an alkali metal selected from the group consisting of lithium, sodium, potassium and rubidium and wherein R is an alkyl radical having from one to 12 carbon atoms. Examples of suitable metal alkoxides include sodium methoxide, lithium tertbutoxide, potassium n-butoxide, rubidium tertbutoxide, potassium tert-pentoxide, sodium n-dodecanoxide, and the like, and admixtures thereof.

The alkynes which are suitable for use in this invention are broadly those organic compounds which possess one ethynyl (-C≡C-H) radical per molecule and which have from two to 20 carbon atoms per molecule. More specifically, they can be represented by the general formula Q-C≡C-H wherein Q is hydrogen; a hydrocarbyl radical, including aliphatic and/or aromatic radicals such as alkyl, aryl, cycloalkyl, alkaryl, alkenyl, alkynyl, arylalkynyl; or a substituted derivative of the above hydrocarbyl radicals wherein the substituents are essentially inert toward any diluent present, the metal alkoxide ROM, and the metal complex (L)$_2$M'X$_2$ under the conditions employed. Such substituents would include halogen, alkoxy, hydroxy and the like.

Examples of suitable alkynes include acetylene, propyne, 1-butyne, 1-octyne, 1-dodecyne, phenylacetylene, 1-pentyne, 1-hexen-5-yne, 4-methoxyphenylacetylene, 4-chlorophenylacetylene, 1-decyne, 1-heptyne, 1-buten-3-yne, 1-phenyl-1,3-butadiyne, 1-eicosyne, and the like, and admixtures thereof.

It is also within the scope of this invention to employ suitable cumulative diolefins, e.g., allene, which isomerize under basic conditions to alkynes, e.g., propyne, which are suitable for use in the method of this invention. The above-mentioned isomerization of cumulative diolefins to alkynes under basic conditions is well known in the art.

The metal complexes which can be employed as starting materials for the process of this invention can be represented by the following general formula: (L)$_2$M'X$_2$; wherein M' is one of nickel, palladium, and platinum; X is one of fluorine, chlorine, bromine, and iodine; and L is the ligand R'$_3$P wherein each R' is individually selected from hydrocarbyl radicals having from one to 12 carbon atoms per radical such as alkyl, cycloalkyl, aryl, alkaryl, aralkyl, and the like. Examples of suitable complexes include bis(triethylphosphine)dichloronickel, bis(tricyclohexylphosphine)dibromonickel, bis(triphenylphosphine)diiodonickel, bis(tri-n-butylphosphine)dichloropalladium, bis(triethylphosphine)diiodopalladium, bis(tri-n-hexylphosphine)dichloroplatinum, bis(tri-n-dodecylphosphine)dibromoplatinum, bis(tricyclohexylphosphine)diiodoplatinum and the like, and admixtures thereof.

According to the method of this invention, the mol ratio of the alkyne compound to the metal complex (L)$_2$M'X$_2$ is at least 2/1 but can be as high as 20/1 or higher. The mol ratio of metal alkoxide ROM to (L)$_2$M'X$_2$ is also at least 2/1 and a ratio slightly in excess of 2/1 is often preferred. There are no significant advantages to be gained by going higher than the mol ratios described.

The reaction is generally conducted in the presence of an inert diluent such as methanol, ethanol, n-pentane, n-hexane, cyclohexane, benzene, toluene and the like. In general, alcohols, ethers, alkanes, and aromatic hydrocarbons can be employed as inert diluents for this reaction, with alcohols being preferred. It is also preferred to carry out the reaction under an inert atmosphere such as nitrogen.

The pressure employed is generally at or near atmospheric pressure. It is also possible with those alkynes which are normally gaseous to simply bubble the gaseous alkyne through a solution or dispersion of the metal complex $(L)_2M'X_2$ and the metal alkoxide ROM in a suitable diluent. If a diluent which is not a solvent for the desired product, e.g., a lower alcohol having from one to four carbon atoms per molecule or an alkane having from four to six carbon atoms per molecule, is employed as the reaction diluent, the desired reaction product precipitates from the reaction mixture, thus simplifying product recovery.

The temperature employed for the method of this invention is generally in the range from about −30°C to about 150°C, preferably in the range from about 0° to about 100°C. The time employed for the reaction according to this invention can range from about 5 seconds up to about 10 hours, and preferably will be in the range of about 30 seconds up to about 15 minutes.

As indicated above, the product of the reaction according to this invention, $(L)_2M'(-C \equiv C-Q)_2$, often precipitates from the reaction mixture as it is formed so that a simple filtration of the reaction mixture is often all that is required to recover the product. Other conventional steps can also be employed in the product recovery, such as evaporation of the diluent, or precipitation of the product by addition of a nonsolvent for the product and recrystallization of the product for a purification step. The utilization of a metal alkoxide having from one to four carbon atoms per molecule is particularly advantageous as the by-product is the corresponding lower alcohol, which serves as at least a portion of the diluent.

Examples of complexes of nickel, palladium, or platinum which can be made according to the process of this invention include bis(triethylphosphine)di(phenylethynyl)nickel, bis(triphenylphosphine)di(ethynyl)palladium, bis(tri-cyclohexylphosphine)di(1-propynyl)platinum, bis(triethylphosphine)di(1-phenyl-1,3-butadiyn-4-yl)nickel, bis(triethylphosphine)di(1-buten-3-yn-4-yl)nickel, bis(tri-n-butylphosphine)di(1-hexynyl)palladium, and the like.

Complexes of the above type, e.g., the nickel complexes, can be employed as oligomerization catalysts for 1,3-dienes as taught in U.S. Pat. No. 3,290,401. These complexes are also suitable for the removal of acetylene from olefin streams, e.g., ethylene.

The following examples are presented in further illustration of the invention and should not be construed in undue limitation thereof.

EXAMPLE I

Bis(triethylphosphine)dichloronickel (2.73 mmol) and phenylacetylene (9.88 mmol) were stirred in 5g of methanol at about 25°C. Sodium methoxide (11.1 mmol) was added to the mixture with thorough mixing. A yellow solid which had rapidly precipitated was dissolved in benzene, the solution filtered and the benzene solution washed with water. The washed benzene layer was diluted with methanol and a yellow solid precipitated. The precipitate was recovered and recrystallized several times from a mixture of methylene chloride and methanol. The melting point for the fourth crop of crystals was 119°–123°C with decomposition. Elemental analysis of the compound showed 67.3% C, 8.2% H and 11.8% Ni while the values calculated for the compound bis(triethylphosphine)di(phenylethynyl)nickel were 67.65% C, 8.11% H and 11.89% Ni. Infrared absorption spectrum analysis and nuclear magnetic resonance (NMR) analysis also supported this designation for the compound prepared according to this invention.

EXAMPLE II

A gas-liquid contact vessel was charged with about 0.005g of bis(triethylphosphine)di(ethynyl)nickel and 100 ml of acetonitrile. After the system was flushed with nitrogen a mixture of ethylene and acetylene was bubbled through the liquid in the vessel at a rate of 4 ml per minute. The feedstream and effluent were analyzed by gas-liquid chromatography (GLC) with the effluent being analyzed several times under the conditions shown below in Table I.

TABLE I

| Sample No. | Time,[a] Min. | Temp,[b] °C | Wt. % Ethylene | Acetylene |
|---|---|---|---|---|
| 1 (Feed) | — | — | 30.35 | 69.65 |
| 2 | 27 | 25 | 56.89 | 42.90 |
| 3 | 45 | 25 | 58.83 | 41.10 |
| 4 | 65 | 80 | 38.89 | 61.02 |
| 5 | 75 | 80 | 28.35 | 71.61 |

[a]Elapsed time from the start of bubbling the ethylene/acetylene mixture through the liquid phase.
[b]Temperature of the liquid phase in the reaction vessel.

The above results demonstrate that the bis(triethylphosphine)di(ethynyl)nickel complex was effective in removing acetylene from an ethylene/acetylene mixture (Samples 2, 3 and 4). The results shown for Samples 4 and 5 indicate that the small amount of catalyst had lost its activity for removing acetylene from the feedstream under the conditions shown.

EXAMPLE III

Sodium methoxide, 0.60g (11 mmol) and phenylacetylene, 1.00g (10 mmol) were mixed together in 2.0g of methanol to form a solution at about 25°C. This solution was added to a mixture of 1.0g (2.7 mmol) $(Et_3P)_2NiCl_2$ in 5.0 ml of methanol at about 25°C. The resulting mixture was thoroughly mixed and immediately turned yellow. After about 5–10 minutes, 5.0 ml of benzene was added to the mixture and the mixture filtered. The reaction flask was washed with an additional 2.0 ml of benzene (5 ml). The washed organic phase was diluted with 20 ml methanol and a yellow solid precipitated which was separated by filtration (0.20g). The filtrate was again diluted with additional methanol whereupon further precipitation of material occurred which was recovered by filtration. This procedure was repeated four times to give a combined yield of 0.51g (39 percent of theoretical) of yellow crystalline material. The yellow crystalline material was recrystallized from a mixture of methylene chloride and methanol to give 0.42g of yellow crystalline material which had a melting point of 139°–140°C with decomposition. The infrared absorption spectrum of the material was identical with that of a previously identified sample of trans-$(Et_3P)_2Ni(-C \equiv CC_6H_5)_2$.

Reasonable variations and modifications are possible within the scope of the foregoing disclosure and the appended claims to the invention.

That which is claimed is:

1. A process for the preparation of a bis(triorganophosphine)-di(alkynyl) metal complex which comprises contacting under suitable reaction conditions a metal alkoxide having the formula ROM with an alkyne compound having the formula Q-C≡C-H and a first metal complex having the formula $(L)_2M'X_2$; wherein R is an alkyl radical having from one to 12 carbon atoms; M is an alkali metal selected from the group consisting of lithium, sodium, potassium, and rubidium; Q is selected from the group consisting of hydrogen, hydrocarbyl radicals, and substituted hydrocarbyl radicals, the substituents thereof being essentially inert with respect to said metal alkoxide and said first metal complex; said alkyne compound having from two to 20 carbon atoms per molecule; M' is a metal selected from the group consisting of nickel, palladium, and platinum: X is at least one halogen selected from the group consisting of fluorine, chlorine, bromine, and iodine; each L is a ligand $R'_3P$ with each R' being individually selected from the group consisting of hydrocarbyl radicals having from one to 12 carbon atoms per radical.

2. A process in accordance with claim 1 wherein said substituents are selected from the group consisting of hydroxy, halogen, and alkoxy radicals.

3. A process in accordance with claim 1 wherein M is sodium.

4. A process in accordance with claim 1 wherein M' is nickel.

5. A process in accordance with claim 4 wherein M is sodium, and each X is chlorine.

6. A process in accordance with claim 5 wherein said metal alkoxide is sodium methoxide, and said alkyne compound is phenylacetylene, and the contacting is carried out in the at least substantial absence of ammonia.

7. A process in accordance with claim 6 wherein said first metal complex is bis(triethylphosphine)dichloronickel.

8. A process in accordance with claim 1 wherein said metal alkoxide, said alkyne compound, and said first metal complex are brought together in one step of admixing.

9. A process in accordance with claim 1 wherein said metal alkoxide and said alkyne compound are admixed together in the absence of said first metal complex and said first metal complex is then added to the resulting admixture.

10. A process in accordance with claim 1 wherein the mol ratio of said alkyne compound to said first metal complex is at least 2:1; the mol ratio of said metal alkoxide to said first metal complex is at least 2:1; and said metal alkoxide, said alkyne compound, and said first metal complex are contacted in the presence of an inert diluent.

11. A process in accordance with claim 10 wherein said reaction conditions comprise a temperature in the range of about −30°C to about 150°C, and a time in the range of about 5 seconds to about 10 hours.

12. A process in accordance with claim 11 further comprising recovering the bis(triorganophosphine)-di(alkynyl) metal complex from the resulting reaction admixture.

13. A process in accordance with claim 12 wherein said metal alkoxide is sodium methoxide, said alkyne compound is phenylacetylene, and said first metal complex is bis(triethylphosphine)dichloronickel.

14. A process in accordance with claim 10 wherein said bis(triorganophosphine)di(alkynyl) metal complex is at least substantially insoluble in said inert diluent under the reaction conditions.

* * * * *